United States Patent [19]
Murphy

[11] 3,725,811
[45] Apr. 3, 1973

[54] LASER AND FLUORESCENT CRYSTALLINE MATERIALS

[75] Inventor: Joseph Murphy, Pittsburgh, Pa.

[73] Assignee: Westinghouse Electric Corporation, Pittsburgh, Pa.

[22] Filed: Sept. 15, 1969

[21] Appl. No.: 866,413

Related U.S. Application Data

[63] Continuation of Ser. No. 474,591, July 26, 1965.

[52] U.S. Cl.................................331/94.5, 252/301.4
[51] Int. Cl....................................................H01s 3/16
[58] Field of Search........331/94.5; 252/301.4, 301.6

[56] References Cited

UNITED STATES PATENTS

| | | | |
|---|---|---|---|
| 3,252,103 | 5/1966 | Geusic et al. | 252/301.4 |
| 3,289,100 | 11/1966 | Ballman et al. | 252/301.4 |
| 3,296,555 | 1/1967 | Fraser et al. | 252/301.4 |
| 3,275,558 | 9/1966 | Sabisky et al. | 252/62.51 |

OTHER PUBLICATIONS

Kiss et al., Cross Pumped $CR^{+3}$-$Nd^{+3}$: YAG Laser System – Applied Physics Letters Vol. 5, No. 10, 15 Nov. 1964. pages 200–202.

*Primary Examiner*—William L. Sikes
*Attorney*—F. Shapoe, Harvey L. Towle and Alex Mich, Jr.

[57] ABSTRACT

Refractory host materials containing a transition metal ion, for example an ion of scandium, titanium, vanadium, chromium, manganese, iron or chromium and a rare earth ion, for example $Nd^{3+}$, $Dy^{3+}$, $Ho^{3+}$ or $Sm^{2+}$, are suitable for laser applications. The transition metal ion and the rare earth ion are substitutionally disposed in the host lattice to replace a metal ion of the host.

16 Claims, 4 Drawing Figures

INVENTOR.
JOSEPH MURPHY

BY Frederick Hoper

ATTORNEYS

LASER AND FLUORESCENT CRYSTALLINE MATERIALS

This is a continuation of application, Ser. No. 474,591, filed July 26, 1965.

This invention relates to laser crystals, particularly those for optically pumped lasers and powders suitable for fluorescent applications.

More specifically, this invention relates to laser crystals containing combinations of rare-earth ions with transition metal ions such as $V^{2+}$, $Cr^{3+}$, and $Mn^{4+}$.

One of the current limitations on the efficiency of optically pumped solid lasers is the lack of suitable absorption bands to match the broad spectral output of available high power pumping lamps or other light source. The fluorescent spectra of rare-earth ions corresponding to $4F-4f$ transitions are generally of low intensity and the amount of energy absorbed by these ions is a small fraction of the light energy used to excite fluorescence. The rare earth ions have only relatively weak $4f-4f$ absorptions and high concentrations of rare-earth dopants are generally required to provide appreciable absorption for laser action.

It is an object of this invention to provide laser crystals containing both rare-earth ions and transition transition metal ions, the transition metal ions having broad absorption bands corresponding to the spectral output of commercial high power lamps, some of the differences between the energy levels or bands of the transition metal ion overlapping some of the differences between the energy levels of the rare-earth ions whereby the excitation induced in the transition metal ion by the lamp is transferred to the rare-earth ion, and consequently, more of the output of the lamp is utilized by the rare-earth ion.

Another object is to provide laser crystals containing a combination of a rare-earth ion and transition metal ion impurities having overlapping spectra of transitions for efficient optical pumping.

A still further object of the invention is to provide a laser crystal containing a combination of rare-earth ions and transition metal ions characterized by a long lived excited state the spectrum of transition from which overlaps the absorption spectrum of the rare-earth ion.

Another object of the invention is to provide a powder comprising crystals containing both a transition metal ion and a rare-earth ion.

These and other objects are apparent from and are achieved in accordance with the following disclosure, in conjunction with the attached drawing wherein.

Briefly, the invention comprises a crystalline material suitable for use as a laser in association with pump radiation which material includes a refractory host material which is transparent in the region of the pump radiation, a transition metal ion in minor proportion to the host metal ion or ions and substitutionally disposed in the lattice to replace a host metal ion, and a rare-earth ion in minor proportion also substitutionally disposed in the lattice to replace a host metal ion; the transition metal ion being characterized by broad absorption bands which absorb the pump radiation and having a metastable state such that its energy is not dissipated during irradiation, the rare-earth ion having energy levels in the visible region, and at least one resonance exists between energy levels of the excited transition metal ion and the unexcited rare-earth ion whereby energy is transferred from the transition metal ion to the rare-earth.

Figure 4:
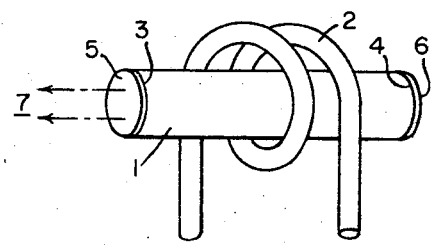
FIG. 4 is a front elevational view of an apparatus utilizing the composition of the invention.

As shown in FIG. 4, a rod shaped crystal 1 is provided with the composition of the invention. Pump energy is supplied by a helical lamp 2 surrounding the rod 1. The lamp 2 may be a xenon flash lamp. Ends 3 and 4 of the rod 1 are polished so as to be optically flat and parallel and have reflective layers 5 and 6 applied thereto, as is well known. Layer 6 is completely reflective while layer 5 is only partially reflective to permit the escape of coherent radiation 7.

In accordance with this invention, it has been discovered that certain transition metal ions will absorb the light output of commercially available high power lamps and transfer a portion of the energy to rare-earth ions. These transition metal ions absorb pump light well and have differences in energy level that match the differences in the rare-earth energy levels in such a manner that a transfer of energy takes place. In other words, the transition metal ions sensitize the rare-earth ions to the pump radiation.

The transfer of energy from these transition metal ions to the rare-earth ions occurs by a non-radiative transfer known in the art as "resonance transfer." In such processes some lines or bands in the emission spectrum of the transition metal ion (or atom) overlap some lines or bands in the absorption spectrum of the rare-earth ion (or atom). Thus, energy absorbed by the first ion can then be transferred to the second ion. The occurrence of the transfer of energy is detected by the observation of fluorescence from the rare-earth ion when monochromatic radiation is used to pump the transition metal ion in a region where the rare-earth ion does not absorb.

More specifically, there is employed a crystalline material, designated "host material" which is transparent to the radiation involved which will accept the transition metal ions and the rare-earth ions. Examples of host materials are $LaAlO_3$, $GdAl_3$, $Y_2O_3$, $Y_3Al_5O_{12}$, $CaF_2$, $ZnF_2$, $BaTiO_3$, $CaTiO_3$, and $SrTiO_3$. Examples of suitable transition metal ions are $Cr^{3+}$, $V^{2+}$, and $Mn^{4+}$. Examples of suitable rare-earth ions are $Nd^{3+}$, $Dy^{3+}$, $Tm^{3+}$, $Ho^{3+}$, and $Sm^{2+}$. Certain of the transition metal ions and the rare-earth ions can be used only in particular hosts. The following are examples of suitable combinations:

TABLE I

| Host | Transition Ion (Ion No.1) | Rare Earth (Ion No.2) |
|---|---|---|
| $LaAlO_3$ $GdAlO_3$ $Y_2O_3$ $Y_3Al_5O_{12}$ | $Cr^{3+}$ | $Nd^{3+}$,$Dy^{3+}$,$Tm^{3+}$,$Ho^{3+}$ |
| $CaF_2$ $ZnF_2$ $BaTiO_3$ | $V^{2+}$ | $Nd^{3+}$,$Dy^{3+}$,$Tm^{3+}$,$Ho^{3+}$,$Sm^{2+}$ |

| CaTiO₃ | | | |
|---|---|---|---|
| SrTiO₃ | Mn⁴⁺ | Nd³⁺, Dy³⁺, Tm³⁺, Ho³⁺, Sm²⁺ | |

Lanthanum aluminate, $LaAlO_3$, is an excellent host for studying the cooperative effects between rare-earth and transition-metal ions since both types may be substitutionally incorporated over large ranges of concentrations. The transition metal ion and the rare-earth ion each is introduced as a compound thereof, usually the oxide, in which it has the desired valence state, and when distributed in the host crystal matrix retains such valence state. Ordinarily the respective ions are disposed in the host crystal lattice as substitutional ions. The host with these added ions can be a single crystal member or a polycrystalline body. Furthermore, the crystal can be a unitary solid body or a powder or in other suitable physical state, the latter subdivided products being suitable for use as fluorescent materials.

The bodies comprising the host material, the rare-earth ions and transition metal ions are crystalline bodies and are not glasses. As a consequence, there are obtained results both as lasers and as fluorescent products different from those secured from glassy materials, due to more regular atomic lattice structure. Furthermore, the user can orient single crystal laser rods in a crystallographic direction for optimum results, whereas on a glass there is no such choice. Also, in a glass the rare-earth and transition metals are not necessarily distributed uniformly whereas in a crystal they can be distributed with a high degree of uniformity and consequently more efficient and reliable laser action is obtainable.

The following example is illustrative of the practice of the invention. Powder samples of $La_{1-x}Nd_xAl_{1-y}Cr_yO_3$ were prepared by reacting the dried powdered oxides, $La_2O_3$, $Al_2O_3$, $Nd_2O_3$, and $Cr_2O_3$, intimately mixed in varying selected proportions, and firing at 1,450°C. for 36 hours, with remixing of the powdered mass after the initial 18 hours of firing. Examination of the final powdered product by X-ray powder diffraction techniques revealed single-phase $LaAlO_3$ with the $Nd^{3+}$ and $Cr^{3+}$ ions distributed in the crystal lattice.

Fluorescent spectra of the samples at 1A resolution were obtained using a one-meter Jarrell-Ash Co. spectrometer and a cooled RCA 7102 photomultiplier, the samples being excited by an AH–6 mercury lamp with filtering by $CuSO_4$ solution. Excitation spectra at 100A resolution were measured by exciting the sample with monochromatic light from a tungsten lamp filtered by a Farrand grating monochromator. In order to reduce the excitation spectra to the basis of constant incident quanta, the wavelength dependence of the quantal output of the Farrand monochromator was measured using a calibrated photomultiplier. In the exictation studies the fluorescence of $Nd^{3+}$ was isolated using a Wratten No. 87C filter in front of the RCA 7102 photomultiplier, while $Cr^{3+}$ fluorescence was isolated with a Wratten No. 88A filter in front of an RCA 7265 photomultiplier.

Figure 1:
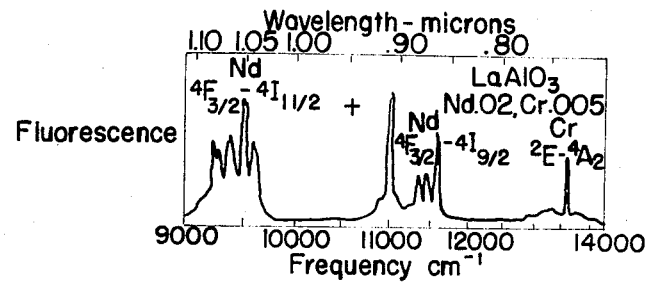
FIG. 1 shows the fluorescence spectrum of $LaAlO_3$, doped with Cr and Nd, excited with a high pressure mercury lamp.
Figure 2:
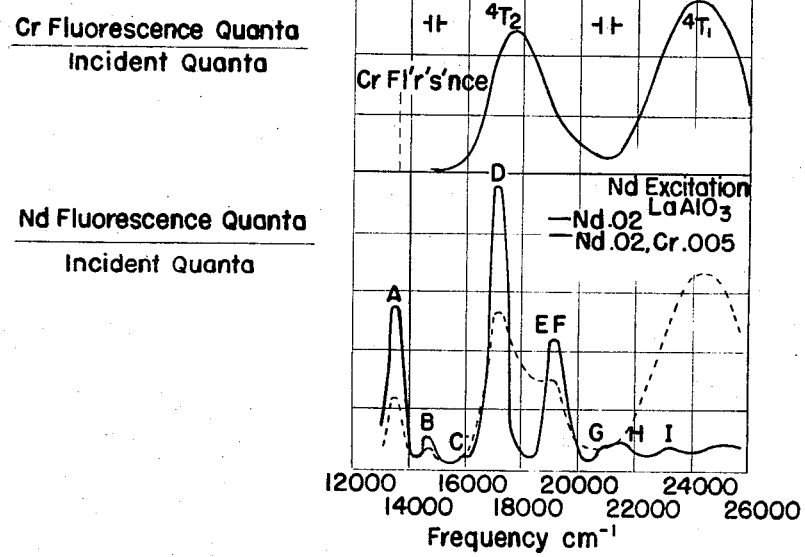
FIG. 2 shows the excitation spectra of $Cr^{3+}$ and $Nd^{3+}$ fluorescence in $LaAlO_3$.

Exemplary of the results of such tests, reference should be had to FIGS. 1 and 2 of the drawing. FIG. 1 shows the room-temperature fluorescence spectrum, covering the region from 0.7 to 1.1 microns of a powder containing 2% Nd and 0.5% Cr in $LaAlO_3$ excited with a high-pressure mercury lamp. The line at 7356A and the structure around it are due to $Cr^{3+}$. The remaining two groups are associated with the fluorescence of $Nd^{3+}$. The spectrum is a superposition of the spectra for the samples containing only $Cr^{3+}$ (0.5%) and only $Nd^{3+}$ (2 percent). The relative intensities of the $Nd^{3+}$ and $Cr^{3+}$ groups shown in FIG. 1 are not significant since the spectral output of the AH–6 lamp favors the $Cr^{3+}$ absorption bands.

FIG. 2 shows the excitation spectra of the $Cr^{3+}$ and $Nd^{3+}$ fluorescence in powders containing 0.5% $Cr^{3+}$ and/or 2% $Nd^{3+}$. The two excitation bands for the $Cr^{3+}$ fluorescence correspond to the absorptions involving transitions from the $4_{A_2}$ to the $4_{T_2}$ and $4_{T_1}$ states. In the samples containing both Cr and Nd the $Cr^{3+}$ excitation spectrum is identical with that shown. However, the intensity of the $Cr^{3+}$ fluorescence decreases rapidly with increasing Nd concentration, being reduced by a factor of about 20 at 2% Nd concentration. There is no evidence therefore for transfer from $Nd^{3+}$ to $Cr^{3+}$.

The excitation spectrum for $Nd^{3+}$ fluorescence in the absence of $Cr^{3+}$ is shown by the solid curve in the lower part of FIG. 2. The peaks in the spectrum correspond to the transitions to the excited states of $Nd^{3+}$ and are labeled in accordance with Dieke and Crosswhite, Appl. Opt. 2 875 (1963). The dashed curve is the excitation spectrum of a sample containing both Nd and Cr. There is clear evidence for transfer of energy from $Cr^{3+}$ to $Nd^{3+}$. A reduction in the $Nd^{3+}$ fluorescence intensity for excitation in the regions of $Nd^{3+}$ absorption (A to F in FIG. 2) also occurs whenever $Cr^{3+}$ is present in the sample.

The room-temperature decay time of the $Nd^{3+}$ fluorescence (about 460 microseconds) does not change when $Cr^{3+}$ is included in the sample. The decay of the $Cr^{3+}$ fluorescence around 7356 A involves a sum of exponentials. The longest decay time is 46 milliseconds at room temperature and is associated with the main line (R line). Our tests indicate that in $LaAlO_3$, the presence of $Nd^{3+}$ does not produce any significant change in the measured R-line lifetime of the $Cr^{3+}$ ion.

Figure 3:
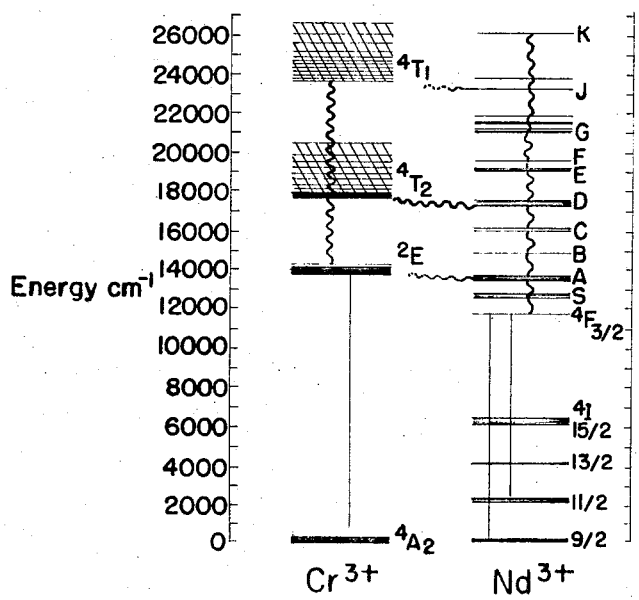
FIG. 3 illustrates the energy level for $Cr^{3+}$ and $Nd^{3+}$ in $LaAlO_3$.

The energy-level diagrams for $Cr^{3+}$ and $Nd^{3+}$ in $LaAlO_3$ as determined from the room-temperature fluorescence and excitation spectra are illustrated in FIG. 3. The structure on the $Cr^{3+}$ levels represents vibronic states.

Since the spectral distribution of the $Cr^{3+}$ fluorescence including the vibronic bands has not been observed to vary with the addition of $Nd^{3+}$, it follows that the energy transfer does not involve the emission and reabsorption of photons, i.e., no radiative transfer.

FIG. 3 shows that there are several possibilities for resonance transfer in the $Cr^{3+}$, $Nd^{3+}$ system. The relaxation of the lattice about the $Cr^{3+}$ ions occurs very rapidly so that any emission or transfer originates from the bottom of the $Cr^{3+}$ bands.

The transfer may involve a dipole-dipole or dipole-quadrupole interaction since it has been observed in samples containing as little as 0.05 atom percent $Nd^{3+}$ with 0.5 atom percent $Cr^{3+}$. Exchange effects should not contribute at these concentrations provided the ions are distributed randomly throughout the lattice. The magnitude of the matrix elements of the interaction Hamiltonian are proportional to the absorption and emission strengths of the separate ions. It is probable that the dominant transfer process involves the $4_{T_2}$ level of $Cr^{3+}$ and the D levels of $Nd^{3+}$ since it is only for this resonance that both ions have relatively large oscillator strengths.

The fact that the lifetime of the R-line emission of $Cr^{3+}$ was not observed to change when $Nd^{3+}$ is present supports the resolved conclusion that transfer occurs from the $4_{T_2}$ level and that transfer from the $2_E$ level is not dominant.

The preferred transition metal ions are those with long radiative lives such as trivalent chromium, divalent vanadium, and tetravalent manganese. The preferred rare-earths for this invention include neodynum, dysprosium, samarium, thulium, and holmium. The preferred host crystals include lanthanum aluminate ($LaAlO_3$) and yttruim aluminum garnet ($Y_3Al_5O_{12}$). Other suitable transition metal ions are ions of scandium, titanium, iron, cobalt and nickel.

Any crystal lattice in which small mole percentages of rare-earth and transition metals can be embedded are suitable. In such crystals the size of one of the metal ions is substantially equal to the size of the rare-earth and transition metal ions. For example the combination of $Cr^{3+}$ with $Nd^{3+}$, $Dy^{3+}$, $Tm^{3+}$, or $Ho^{3+}$ can be used in a host of $LaAlO_3$, $Y_2O_3$, or $Y_3Al_5O_{12}$. The combination of $V_{2+}$ with $Nd^{3+}$, $Dy^{3+}$, $Tm^{3+}$, $Ho^{3+}$, or $Sm^{2+}$ can be used in hosts of $CaF_2$ or $ZnF_2$. Similarly, the combination of $Mn^{4+}$ with $Nd^{3+}$, $Dy^{3+}$, $Tm^{3+}$, $Ho^{3+}$, or $Sm^{3+}$ may be operative in a host of $BaTiO_3$, $CaTiO_3$, or $SrTiO_3$. The combination of rare-earth and transition metal ions is one in which some lines or bands of the transition metal's emission spectrum overlap some lines of bands of the rare-earth's absorption spectrum.

The amount of rare-earth in the host crystal may vary from about 0.0005 mole percent to 5 mole percent. The amount of transition metal in the host crystal may vary from about 0.0005 mol percent to 1 mol percent.

The following examples are to be construed as illustrative only and not as limiting in any way the scope and spirit of the invention.

EXAMPLE I

To a mixture of 1.0 mol of $La_2O_3$ (Lindsay 99.9+% pure) and 1.0 mol of $Al_2O_3$ (Linde high-purity Grade A) in powder form (finer than 200 mesh) were added 0.001 mol of $Nd_2O_3$ (Lindsay 99.9+% pure) and 0.001 mol of $Cr_2O_3$ (Fisher certified). The dry materials were thoroughly mixed and ground together, then fired at 1,450°C. for 36 hours, with remixing after 18 hours. The product was examined by X-ray powder diffraction and found to be single-phase $LaAlO_3$ with Nd and Cr partially replacing the La throughout the crystal lattice. It was excited by an AH–6 mercury lamp with a $CuSO_4$ solution filter and the fluorescence spectrum recorded. The spectrum showed strong fluorescence of $Nd^{3+}$ and $Cr^{3+}$.

EXAMPLE 2

A mixture of 0.4875 mol of $La_2O_3$ and 0.4875 mol of $Al_2O_3$ was thoroughly mixed. To it were added 0.0200 mol of $Nd_2O_3$ and 0.00500 mol of $Cr_2O_3$. The resulting mixture was ground, then fired as in Example 1. It was excited by an AH–6 mercury lamp with a $CuSO_4$ solution filter and the fluorescence spectrum recorded. The spectrum is shown in FIG. 1.

EXAMPLE 3

A series of crystals in powder form of the formula $La_{1-x}Nd_xAl_{1-y}Cr_yO_3$ were prepared by the method of Example 1 wherein the value of $x$ were 0, 0.0005, 0.005, 0.01, 0.02 and 0.05, and the values of $y$ were 0, 0.0005, 0.001, 0.005 and 0.01. The fluorescence spectra of these crystals during irradiation with light in the region where chromium absorbs strongly and neodymium does not absorb when using a tungsten lamp filtered by a Farrand grating monochromator were recorded and all of them, except those wherein $x$ and $y$ were zero, showed fluorescence of $Nd^{3+}$. No such fluorescence was observed when $x$ or $y$ were zero.

EXAMPLE 4

A crystal rod of Gd $Al_3$ with $Cr^{3+}$ and $Nd^{3+}$ ions in proportions of 0.02 and 0.01 mol is prepared by following the procedure of Example 1, then melting the powdered mixture and pulling a rod by the known Bridgman technique. The rod is ground to produce parallel end faces which are covered with reflective coatings as illustrated in FIG. 4 of the drawing. A xenon flash lamp is used to pump the crystal rod and laser action is observed.

In a similar manner crystal rods may be prepared from all of the compositions of Table I and used as lasers.

Finally, some of the elements of the 5$f$ rare-earth series, such as $U^{4+}$, may be employed in lieu of the rare earths listed previously in practicing the invention.

While the invention has been described with reference to particular embodiments and examples, it will be understood, of course, that modifications, substitutions and the like may be made therein without departing from its scope.

I claim as my invention:

1. A laser crystal comprising 0.0005 to 5 percent of an ion of a rare-earth selected from the group consisting of neodymium, dysprosium, samarium, erbium, uranium, thulium, and holmium and 0.0005 to 1 percent of an ion of a transition metal selected from the group consisting of scandium, titanium, vanadium, chromium, manganese, iron, cobalt, and nickel in a host crystal selected from the group consisting of $LaAlO_3$, $Y_2O_3$, $Y_3Al_5O_{12}$, $GdAlO_3$, $CaF_2$, $ZnF_2$, $BaTiO_3$, $CaTiO_3$ and $SrTiO_3$, in combinations wherein a metal ion of the host crystal is substantially equal in size to the rare-earth and transition metal ions whereby the latter ions can replace the metal ion in the host crystal.

2. A laser crystal as defined by claim 1 wherein the ion of the rare-earth is selected from the group consisting of $Nd^{3+}$, $Dy^{3+}$, $Tm^{3+}$, and $Ho^{3+}$, the transition metal ion is $Cr^{3+}$ and the host crystal is selected from the group consisting of $LaAlO_3$, $Y_2O_3$, $Y_3Al_5O_{12}$, and $GdAlO_3$.

3. A laser crystal as defined by claim 1 wherein the ion of the rare-earth is selected from $Nd^{3+}$, $Dy^{3+}$, $Tm^{3+}$, $Ho^{3+}$, and $Sm^{2+}$, the transition metal ion is $V^{2+}$ and the host crystal is selected from the group consisting of $CaF_2$ and $ZnF_2$.

4. A laser crystal as defined by claim 1 wherein the rare-earth ion is selected from the group consisting of $Nd^{3+}$, $Dy^{3+}$, $Tm^{3+}$, $Ho^{3+}$, and $Sm^{2+}$, the transition metal ion is $Mn^{4+}$ and the host crystal is selected from the group consisting of $BaTiO_3$, $CaTiO_3$, and $SrTiO_3$.

5. A laser crystal of the formula $$La_{1-x}Nd_xAl_{1-y}Cr_yO_3$$

wherein $x$ is a positive number up to 0.05, inclusive, and $y$ is a positive number up to 0.01, inclusive.

6. A laser of $LaAlO_3$ containing 0.05 mol percent of $Nd_2O_3$ and 0.05 mol percent of $Cr_2O_3$.

7. A laser crystal of $LaAlO_3$ containing 2 mol percent of $Nd_2O_3$ and 0.5 mol percent of $Cr_2O_3$.

8. The method of producing a crystalline laser member comprising firing an intimate fine powder mixture of 0.05 to 5 mol percent of an oxide of a rare-earth selected from the group consisting of neodymium, dysprosium, samarium, erbium, thulium, ytterbium, and holmium, 0.05 to 1 mol percent of an oxide of a transition metal selected from the group consisting of scandium, titanium, vanadium, chromium, manganese, iron, cobalt, and nickel, and 94 to 99.9 mol percent of a compound selected from the group consisting of $GdAlO_3$, $LaAlO_3$, $Y_2O_3$, $Y_3Al_5O_{12}$, $CaF_2$, $BaTiO_3$, $ZnF_2$, $CaTiO_3$, and $SrTiO_3$ and oxides engendering the compounds, at a high temperature until a single-phase crystalline material is produced.

9. A yttrium aluminum garnet crystal host containing neodymium ions and from 0.0005 to 1 percent chromium ions.

1.0 The crystal of claim 9 containing from 0.05 to 5 percent of neodymium ions and 0.05 to 1 percent of chromium ions.

11. A crystalline material suitable for use as a laser in association with pump radiation, comprising (1) a refractory host material transparent in the region of the pump radiation, the host material comprising a metal ion in the crystal lattice thereof, (2) at least 0.0005 mol percent of a rare earth ion selected from the group consisting of $Nd^{3+}$, $Dy^{3+}$, $Tm^{3+}$, $Ho^{3+}$, $Sm^{2+}$ and (3) at least 0.0005 mol percent of a transition metal ion selected from the group consisting of $V^{2+}$ and $Mn^{4+}$, said metal ion of the host material being substantially equal in size to the rare-earth and transition metal ions.

12. The crystalline material of claim 11 wherein the rare-earth ion is $Nd^{3+}$.

13. A laser comprising a material containing chromium and neodymium, resonant means for supporting optical energy emitted by said material, and means for supplying energy at the absorption frequencies of said material to said material, wherein said material consists of the composition of matter having the molar composition:

$$Y_{(3-x)} Nd_x Al_{(5-y)} Cr_y O_{12}$$

wherein $x$ is in the range $0.0003 \leq x \leq 0.06$ and $y$ is in the range $0.0005 \leq y \leq 0.1$.

14. The composition of matter having the molar composition $Y_{(3-x)} Nd_x Al_{(5-y)} Cr_y O_{12}$ wherein $x$ is in the range $0.0003 \leq x \leq 0.06$ and $y$ is in the range $0.0005 \leq y \leq 0.1$.

15. In combination, a material containing chromium and neodymium and means for supplying energy in the spectral range of the chromium absorption so that energy absorbed by the chromium is transferred to neodymium, wherein said material consists of the composition of matter having the formula:

$$R_{(a-b)} Nd_b Al_{(c-d)} Cr_d O_e$$

wherein R is selected from the group consisting of Y and La, $a$ is 3 when R is Y and 1 when R is La, $b$ is in the range $0.0003 \leq b \leq 0.06$, $c$ is 5 when R is Y and 1 when R is La, $d$ is in the range $0.0005 \leq d \leq 0.1$ and $e$ is 12 when R is Y and 3 when R is La.

16. The composition of matter having the formula:

$$R_{(a-b)} Nd Al_{(c-d)} Cr_d O_e$$

wherein R is selected from the group consisting of Y and La, $a$ is 3 when R is Y and 1 when R is La, $b$ is in the range $0.0003 \leq b \leq 0.06$, $c$ is 5 when R is Y and 1 when R is La, $d$ is in the range $0.0005 \leq d \leq 0.1$ and $e$ is 12 when R is Y and 3 when R is La.

* * * * *